United States Patent
Liu et al.

(10) Patent No.: US 8,055,785 B2
(45) Date of Patent: Nov. 8, 2011

(54) RATE CONTROL FOR STREAM SWITCHING

(75) Inventors: Wei Liu, San Jose, CA (US); Lina Dong, Saint Louis, MO (US); Yingnan Zhu, Columbia, MO (US); Wenjun Zeng, Columbia, MO (US); Hong Heather Yu, West Windsor, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 23 days.

(21) Appl. No.: 12/561,008

(22) Filed: Sep. 16, 2009

(65) Prior Publication Data

US 2010/0070645 A1 Mar. 18, 2010

Related U.S. Application Data

(60) Provisional application No. 61/097,746, filed on Sep. 17, 2008.

(51) Int. Cl.
*G06F 15/16* (2006.01)
(52) U.S. Cl. ........... 709/231; 709/232; 709/238
(58) Field of Classification Search .......... 709/231–232, 709/234, 238
See application file for complete search history.

(56) References Cited

U.S. PATENT DOCUMENTS

| | | | |
|---|---|---|---|
| 6,996,173 B2 | 2/2006 | Wu et al. | |
| 7,071,992 B2 * | 7/2006 | Chen et al. | 348/441 |
| 7,369,610 B2 | 5/2008 | Xu et al. | |
| 2002/0006128 A1 | 1/2002 | Yehuda et al. | |
| 2004/0268400 A1 * | 12/2004 | Barde et al. | 725/94 |
| 2006/0182052 A1 * | 8/2006 | Yoon et al. | 370/312 |
| 2006/0227870 A1 * | 10/2006 | Tian et al. | 375/240.03 |
| 2008/0098123 A1 * | 4/2008 | Huang et al. | 709/231 |
| 2008/0109556 A1 * | 5/2008 | Karlberg | 709/231 |
| 2008/0256272 A1 * | 10/2008 | Kampmann et al. | 710/57 |

FOREIGN PATENT DOCUMENTS

| | | |
|---|---|---|
| CN | 1960453 A | 5/2007 |
| CN | 101155298 A | 4/2008 |

OTHER PUBLICATIONS

H. Schwarz, D. Marpe, T. Wiegand, "Overview of the scalable video coding extension of the H.264/AVC standard", IEEE Trans. Circuits and Systems for Video Technology, vol. 17, No. 9, pp. 1103-1120, Sep. 2007.

X. Sun, F. Wu, S. Li, W. Gao and Y. Zhang, "Seamless switching of scalable video bitstreams for efficient streaming," IEEE Trans. Multimedia, vol. 6, No. 2, pp. 291-303, Apr. 2004.

(Continued)

*Primary Examiner* — Philip B Tran
(74) *Attorney, Agent, or Firm* — Conley Rose, P.C.; Grant Rodolph (57) ABSTRACT

An apparatus comprising a first node configured to communicate with a second node, wherein the first node is configured to receive a first stream from the second node, receive a bridging stream from the second node, and receive the second stream from the second node, and wherein the bridging stream has a lower bit-rate than the second stream. Included is an apparatus comprising at least one processor configured to implement a method comprising transmitting a first stream at a first time, transmitting a bridging stream that has a bit-rate greater than the first stream and less than the second stream at a second time, and transmitting the second stream at a third time.

22 Claims, 6 Drawing Sheets

OTHER PUBLICATIONS

Z. Avramova, D. De Vleeschauwer, K. Spaey, S. Wittevrongel, H. Bruneel and C. Blondia, "Comparison of simulcast and scalable video coding in terms of the required capacity in an IPTV network," IEEE proc. Packet Video, pp. 113-122, Nov. 2007.

J. Liu, B. Li and Y. Zhang, "Optimal stream replication for video simulcasting," IEEE Trans. Multimedia, vol. 8, No. 1, pp. 162-169, Jan. 2006.

N. Faerber and B. Girod, "Robust H.263 compatible video transmission for mobile access to video servers," Proc. IEEE Int. Conf. Image Processing, 1997.

M. Karczewicz and R. Kurceren, "The SP- and SI-Frames Design for H.264/AVC," IEEE Trans. Circuits and Systems for Video Technology, vol. 13, No. 7, pp. 637-644, Jul. 2003.

E. Setton and B. Girod, "Rate-distortion analysis and streaming of SP and SI frames," IEEE Trans. Circuits and Systems for Video Technology, vol. 16, No. 6, pp. 733-743, Jun. 2006.

X. Sun, S. Li, F. Wu, G. Shen, and W. Gao, "Efficient and flexible drift-free video bitstream switching at predictive frames," Proc. IEEE Int. Conf. Multimedia and Expo, vol. 1, pp. 541-544, Lausanne, Switzerland, Aug. 2002.

B. Xie and W. Zeng, "Fast bitstream switching algorithms for real-time adaptive video multicasting," IEEE Trans. Multimedia, vol. 9, No. 1, pp. 169-175, Jan. 2007.

B. Xie and W. Zeng, "Rate distortion optimized dynamic bitstream switching for scalable video streaming," Proc. IEEE Inter. Confer. Multimedia and Expo, pp. 1327-1330, Jun. 2004.

J., Xin, C.-W. Lin and M.-T. Sun, "Digital video transcoding," Proceedings of IEEE, vol. 93, No. 1, pp. 84-97, Jan. 2005.

H. Shen, X. Sun, and F. Wu, "Fast H.264/MPEG-4 AVC transcoding using power-spectrum based rate-distortion optimization," IEEE Trans. Circuits and Systems for Video Technology, vol. 18, No. 6, pp. 746-755, Jun. 2008.

J.M., Boyce and A.M. Tourapis, "Fast efficient channel change," International Conf. Consumer Electronics, Jan. 2005.

Y. Lee, J. Lee, I. Kin, and H. Shin, "Reducing IPTV channel switching time using H.264 scalable video coding," IEEE Trans. Consumer Electronics, vol. 54, No. 2, pp. 912-919, May 2008.

H. Joo, H. Song. D.-B. Lee; I. Lee, "An effective IPTV channel control algorithm considering channel zapping time and network utilization," IEEE Trans. Broadcasting, vol. 54, No. 2, pp. 208-216, Jun. 2008.

C.Cho, I. Han, Y. Jun and H. Lee, "Improvement of channel zapping time in IPTV services using the adjacent groups join-leave method," International Conf. Advanced Communication Technology, Feb. 2004.

Y. Kim, J.K. Park, H.J. Choi, S. Lee, H. Park, J. Kim, Z. Lee and K. Ko, "Reducing IPTV channel zapping time based on viewer's surfing behavior and preference," IEEE International Symposium on Broadband Multimedia Systems and Broadcasting, Mar. 2008.

H. Fuchs and N. Farber, "Optimizing channel change time in IPTV applications," IEEE International Symposium on Broadband Multimedia Systems and Broadcasting, Mar. 2008.

Foreign communication from a counterpart application, PCT/CN2009/074003, International Search Report dated Dec. 24, 2009, 3 pages.

* cited by examiner

RATE CONTROL FOR STREAM SWITCHING

CROSS-REFERENCE TO RELATED APPLICATIONS

This application claims priority to U.S. Provisional Application Ser. No. 61/097,746, filed Sep. 17, 2008 by Wei Liu et al., and entitled "Rate Control for Bitstream Switching," which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Currently, video content can be delivered using different technologies, such as radio frequency broadcast, cable television (CATV) systems, content delivery networks, and Internet Protocol Television (IPTV). In many instances, the video content is delivered using the architecture and networking methods of the Internet Protocol (IP) suite over a packet-switched network infrastructure, e.g., Internet and broadband Internet access. Typically, the video content is delivered across the network on a "best effort" basis, which can add challenges to the design of the aforementioned systems to meet any real time requirements. To support the real time requirement of television services, streamed services are buffered on the client side. The buffering is used to reduce jittering that can be caused due to receiving "out-of-order" streamed packets. Buffering is also used when switching between streamed services to avoid abrupt channel switching that can degrade viewing quality, e.g. visible jittering. However, buffering a newly received streamed service causes undesirable delays to view its content. The buffering delay may depend on the service bit-rate and the network available bandwidth. For example, buffering streamed services that have higher bit-rates in comparison to other services may cause more delay.

SUMMARY

In a first embodiment, the disclosure includes an apparatus comprising a first node configured to communicate with a second node, wherein the first node is configured to receive a first stream from the second node, receive a bridging stream from the second node, and receive the second stream from the second node, and wherein the bridging stream has a lower bit-rate than the second stream.

In a second embodiment, the disclosure includes an apparatus comprising at least one processor configured to implement a method comprising transmitting a first stream at a first time, transmitting a bridging stream that has a bit-rate greater than the first stream and less than the second stream at a second time, and transmitting the second stream at a third time.

In a third embodiment, the disclosure includes a method comprising providing a first stream having a first bit-rate and a first content, subsequently providing a bridging stream having a bridging bit-rate greater than about the first bit-rate and a bridging content similar to the first content, and subsequently providing a second stream having a second bit-rate greater than about the first bit-rate and a second content similar to the bridging content.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method to reduce buffering delay time during stream switching in packet-switched networks. Specifically, when switching from a first stream to a second stream (e.g. from a first IPTV channel to a second IPTV channel or from an IPTV preview channel to a high-definition (HD) version of the same channel), a bridging stream may be transmitted after the first stream but before the second stream. The bridging stream may have a higher rate than the first stream, and a similar content and lower bit-rate than the second stream. As such, buffering the bridging stream may cause less delay time than the second stream and the content may be received and provided at an earlier time. The bridging stream may also have a higher bit-rate than the first stream, which may improve Quality of Service (QoS) or Quality of Experience (QoE) requirements for the viewer.

Figure 1:
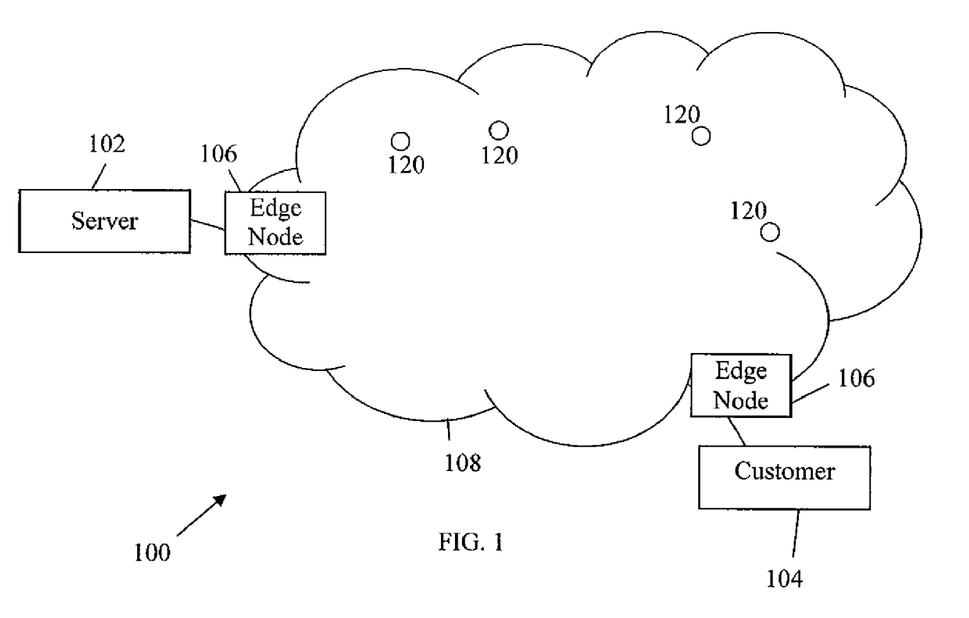
FIG. 1 is a schematic diagram of an embodiment of a stream transport system.

FIG. 1 illustrates one embodiment of a stream transport system 100 that provides streamed services, such as IPTV content. The stream transport system 100 may comprise a server 102, at least one customer 104, and a network 108 comprising a plurality of edge nodes 106 and a plurality of interior nodes 120. Although FIG. 1 illustrates the stream transport system 100 with four interior nodes 120, two edge nodes 106, and one customer 104, the stream transport system 100 may comprise any number of interior nodes 120, edge nodes 106, and customers 104.

In an embodiment, the server 102 may be any device, component, or source that may produce, distribute, or pass content onto the network 108. For example, the server 102 may be an IPTV, an audio distribution server, and/or a video distribution server. The server 102 may also be a distribution node in a voice/video over IP (VoIP) systems and/or interactive gaming applications. In other embodiments, the server 102 may be an external node or connection to the network 108. The customer 104 may be any device, component, destination, or network that may receive content from the network 108 and/or the server 102. For example, the customer 104 may be a fixed or mobile user-oriented device, such as a desktop computer, notebook computer, set-top box, TV, personal digital assistant (PDA), or cellular phone. Alternatively, the customer 104 may be an edge node that passes data from the network 108 and onto another external network such as an access network.

In an embodiment, the network 108 may be any communications system that may be used to transport data between the server 102 and the customer 104. For instance, the network 108 may be packet-switched network, such as the Internet, which may transport packets between the edge nodes 106 and the interior nodes on a "best effort" basis. Alternatively, the network 108 may be an Ethernet transport network that prioritizes transportation of the content to the customers 104. In another embodiment, the network 108 may be a dedicated video distribution network that transports content channels from the server 102 to the customers 104. The network 108 may also be a backbone network, an access network, an optical network, a wire-line transport network, an Institute of Electrical and Electronic Engineers (IEEE) 802 network, or a wireless network, such as a cellular network.

The edge nodes 106 may be any devices that transport content between the interior nodes 120 and the customer 104 and/or server 102. Specifically, the edge nodes 106 may establish connections with other edge nodes 106 or with various interior nodes 120. The edge nodes 106 may include bridges, switches, routers, or various combinations of such devices. For example, the edge nodes 106 may include Back Bone Edge Bridges (BEBs), Provider Edge Bridges (PEBs), user network interfaces (UNIs), or various combinations of such devices. The edge nodes 106 may also connect to at least some of the interior nodes 120. In some embodiments, the edge nodes 106 may not connect directly to the server 102 and/or the customer 104.

The interior nodes 120 may be any devices that transport content through the network 108. For example, the interior nodes 120 may include switches, routers, bridges including Back Bone Core Bridges (BCBs) and Provider Core Bridges (PCBs), or various combinations of such devices. The interior nodes 120 may connect with each other via a plurality of links, such as electrical, optical, or wireless links. The interior nodes 120 may also connect to at least some of the edge nodes 106. In some embodiments, the interior nodes 120 may not connect directly to the server 102 and/or the customer 104. In some embodiments, the edge nodes 106 and the interior nodes 120 may be configured similarly.

In an embodiment, the customer 104 may be coupled to one of the edge nodes 106 and may request content, such as a streamed service, from the edge node 106. The edge node 106 may then forward the request to the server 102 via the network 108, for instance using packet switching. When the server 102 receives the request, the server 102 may transmit the requested stream to the customer 104. The stream may comprise video and/or voice over IP or any other data packets. In some embodiments, the stream may comprise Ethernet frames, IP packets asynchronous transfer mode (ATM) cells, or any similar data structure. Further, different requested streamed services, such as voice and/or video services, may be transmitted to the customer 104. The different streamed services may have different bit-rates, such as different video or digital radio channels. For example, high definition (HD) channels may have higher bit-rates than standard definition channels.

In some embodiments, the streamed services may be received by the customer 104 and viewed at a later timer. For example, a video program may be downloaded and then viewed at a later time after the entire program is downloaded. However, in other embodiments, the streamed services may be received and viewed at about the same time or after relatively short delays. For example, a television program may be viewed while the program is being downloaded to provide substantially real time viewing experience with limited delay. For instance, when IPTV content is transmitted to the customer 104, the corresponding stream may be received, buffered, and then viewed after a delay time that may depend on the bit-rate of the stream. Generally, if such streams are received and then viewed with no or insufficient buffering, the streams may suffer from video degradation or visible jittering. Typically, to reduce the buffering, extensive coding schemes, e.g. scalable video coding (SVC) or transcoding, or other complex transmission schemes may be used. However, such schemes may require substantial computing and/or reduce bandwidth capacity.

In an embodiment, to reduce the buffering delay time for streamed services and limit video quality degradation, a bridging stream may be transmitted before or concurrently with the requested stream. The bridging stream may be transmitted after a first initially transmitted stream and before or concurrently with a second requested stream, for example during channel switching or channel zapping between a first channel and a second channel. The bridging stream may have a higher bit-rate than the first stream. In addition, the bridging stream may have similar content but a lower bit-rate than the second stream. As such, buffering the bridging stream may require less time than the second stream (but more time than the first stream), and the requested content may be viewed at an earlier time than the second stream. In some embodiments, the first stream may have similar content but lower bit-rate than the second stream, for example in applications such as IPTV Picture-in-Picture (PiP) or multichannel preview. By using the bridging stream between the first stream and the second stream, video degradation may be avoided and the QoS or QoE for the client may be improved.

In an embodiment, transmitting the bridging stream may not require additional network resources or bandwidth. Specifically, the original and requested streams may utilize a specific amount of bandwidth, for example 100 Megabits per second (Mbps), while the bridging stream may utilize a reduced portion of bandwidth, for example 60 Mbps. When the bridging stream is streamed, the remaining unused bandwidth (e.g. 40 Mbps) may be used to begin streaming the requested stream. When the customer has received a sufficient amount of the bridging stream to allow for the buffering delay of the requested stream, the server may then transmit only the requested stream. Alternatively, the bridging stream may be transmitted at the full rate (e.g. 100 Mbps) until the customer has received a sufficient amount of the bridging stream to allow for the buffering delay of the requested stream, if the server has a sufficient amount of the bridging stream stored or buffered.

Figure 2:
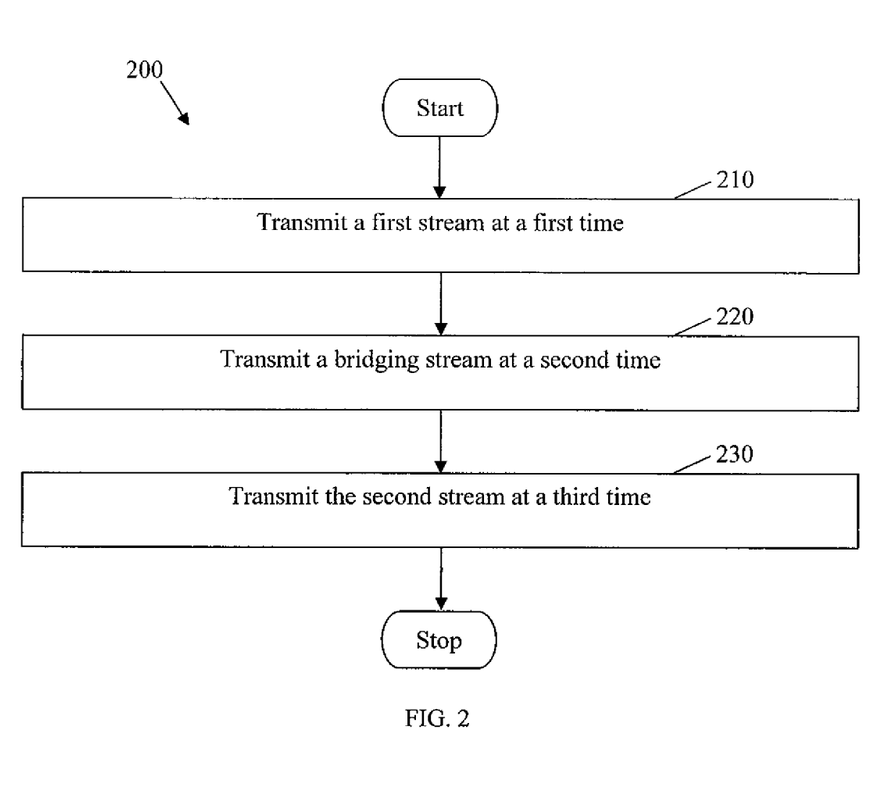
FIG. 2 is a flowchart of an embodiment of a stream switching method.

FIG. 2 is a flowchart of one embodiment of a stream switching method 200, which may be used to switch from a first stream to a second stream. Specifically, the stream switching method 200 may use a bridging stream to switch between the first stream and the second stream, reduce the buffering delay needed to switch between the two streams, and reduce video jittering due to increased bit-rates. The method 200 may begin at block 210, where a first stream may be transmitted to a customer at a first time. Here, a determination may be made to switch to the bridging stream. For example, the decision could be made autonomously by the server, or a request may be received to switch from a first stream to a second stream. For instance, the customer may send to the server a request to switch channels or view the same channel in higher definition, e.g. in PiP or multichannel preview application.

Figure 3:
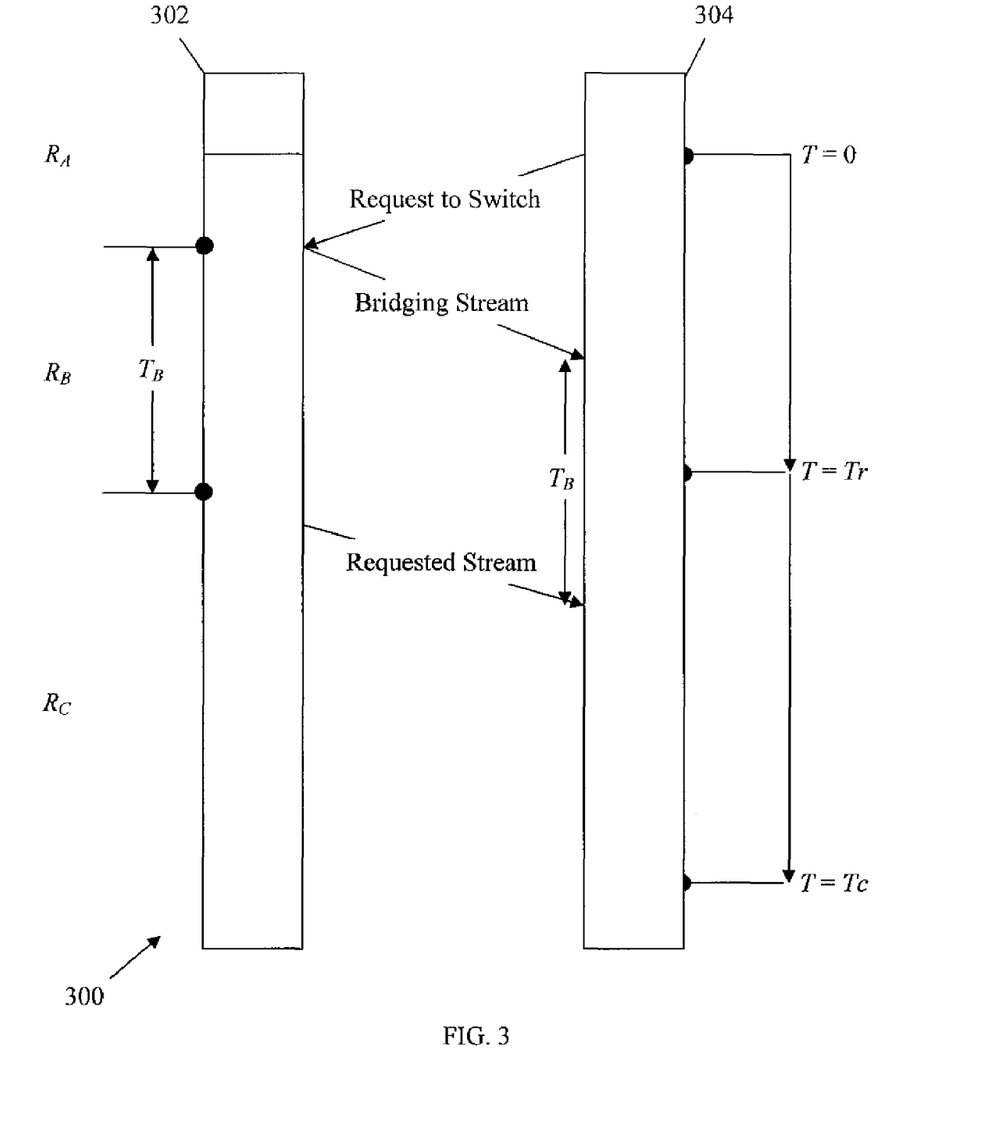
FIG. 3 is a schematic diagram of an embodiment of a stream exchange.

FIG. 3 illustrates an embodiment of a stream exchange 300 to switch from the first stream to the second stream, which may occur in response to a request from a customer 304. Specifically, the customer 304 may receive from a server 302 the first stream, which may have a first bit-rate $R_A$. Next, for example at T=0, the customer 304 may request from the server 302 a second stream, which may have a bit-rate $R_C$, which may be greater than $R_A$.

Returning to FIG. 2, the method 200 may then proceed to block 220, where a bridging stream may then be transmitted at a second time. For instance, the server may transmit the bridging stream to the customer after a time from receiving the request for the second stream. The bridging stream may have similar content or program but higher bit-rate than the first stream. The bridging stream may also have similar content or program but lower bit-rate than the second stream. The bridging stream may continue to stream from the server 302 to the customer 304 until canceled, or may be limited to about the expected buffering time from the second stream. If desired, a plurality of bridging streams may be transmitted.

For instance in FIG. 3, the server 302 may begin transmitting the bridging stream after about half a round trip time (RTT) between the server 302 and the customer 304, e.g. T=RTT/2. During the RTT, the customer 304 may continue to buffer and play the content of the first stream or may be idle if no such content exists. Next, at T=RTT, the customer 304 may begin receiving the bridging stream. The bridging stream may be first buffered and then played after a determined response time $T_r$. The response time may be based on the bridging stream's bit-rate, a buffering time, server response time, and/or a network bandwidth. In an embodiment, to play a video frame properly, a minimum required quantity of buffered bits may be needed. Thus, to play the bridging stream content, the quantity of bits received after RTT and before $T=T_r$ may not be less than the minimum required quantity of buffered bits. This relationship may be expressed using the mathematical relationship:

$$bw \times (T_r - RTT) \geq T_{buff} \times R_B,$$

where bw is an effective network transmission bandwidth, $T_{buff}$ is a minimum buffering time for playing a video frame, and $R_B$ is the bit-rate of the transmitted bridging stream. Hence, $T_r$ may have a minimum value that may be calculated as follows:

$$T_r \geq \frac{T_{buff} \times R_B}{bw} + RTT.$$

Returning to FIG. 2, the method 200 may then proceed to block 230, where the second stream may then be transmitted at a third time. The server may transmit the second stream to the customer after transmitting an appropriate sized bridging stream, which may reduce the delay time and improve QoS and/or QoE. For instance, in FIG. 3, the server 302 may begin transmitting the second stream after a third time $T_B$ from the start time of transmitting the bridging stream, e.g. T=RTT/2. If sufficient bandwidth is available, $T_B$ may be equal to about zero. During such time, the customer 304 may complete playing the entire content of the bridging stream. The second stream may be first buffered when received, and then played after a play time $T=T_c$. To play the second stream content properly, the quantity of bits received after RTT and before $T=T_c$ may not be less than the minimum required quantity of buffered bits and the quantity of bits received after $T=T_r$ and before $T=T_c$. This relationship may be expressed using the mathematical relationship:

$$bw \times (T_c - RTT) \geq (T_c - T_r) \times R_B + T_{buff} \times R_C.$$

Hence, $T_c$ may have a minimum value that may be calculated as follows:

$$T_c \geq \frac{RTT \times bw - T_r \times R_B + T_{buff} \times R_C}{bw - R_B}.$$

When the value of RTT may be negligible in comparison to $T_{buff}$, the third time $T_B$ may be determined based on the relationship:

$$T_B = \frac{(T_c - T_r) \times R_B}{bw}.$$

Several variations of the disclosed method are possible. In some embodiments, a request may be transmitted to switch from the first stream to the second stream. Alternatively, the switch may be done without a request. In other words, the server can be designed such that it switches automatically. For example, a client may sends a request to the server for a video (or audio) stream, $V_b$, (possibly the client was watching another video stream, e.g. another channel) at time $T_1$. To reduce the start up time delay, $T_2-T_1$, caused by buffering at the client side, the server can first transmit a low bit-rate stream, $V_{b1}$, of the same comment for instant playback. In such a case, the client starts to playback $V_{b1}$ at time $T_{1*}$, where $T_1-T_{1*}$ is very small. Because $V_{b1}$ might be a very low bit-rate, the signal quality could be significantly degraded. To overcome this problem, a new bridging stream, $V_{b2}$, may be introduced with a hit-rate smaller than $V_b$ but larger than $V_{b1}$. $V_b$, $V_{b1}$, and $V_{b2}$ may be transmitted from the server simultaneously or with some time differentiation. In addition, a plurality of the bridging streams could be transmitted. For example, another bridging stream, $V_{b3}$, that has a bit-rate between $V_b$ and $V_{b2}$ could be played after $V_{b2}$ and before $V_b$.

Figure 4:
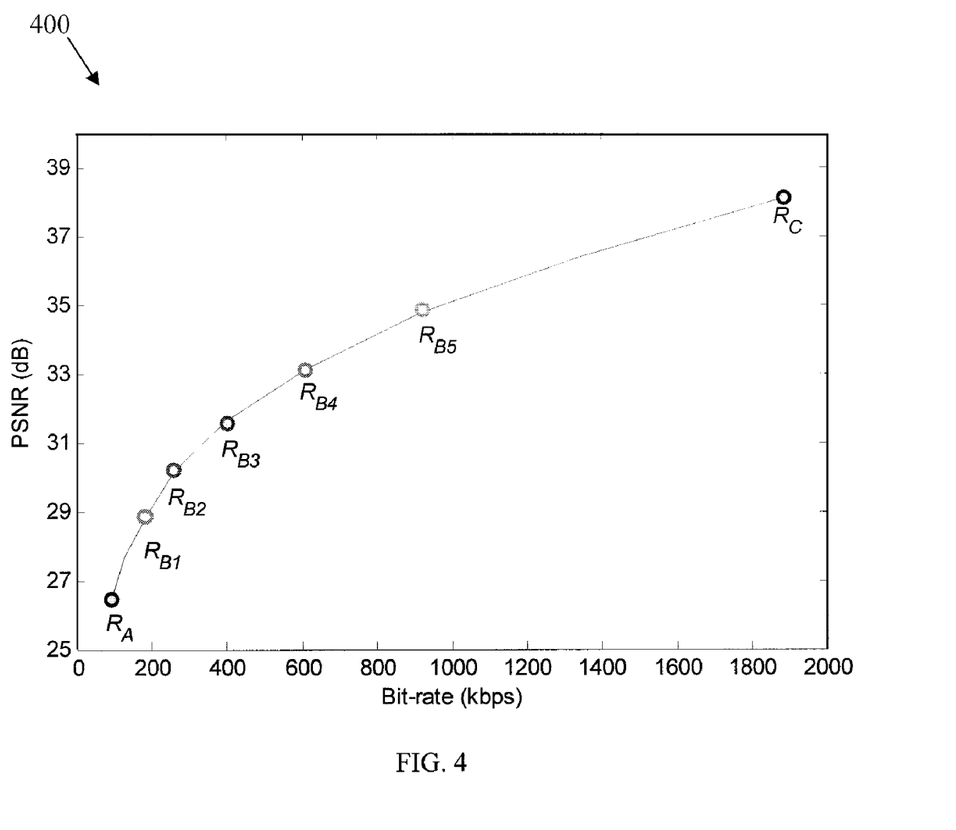
FIG. 4 is a chart of an embodiment of bit-rate vs. signal quality relationship.

FIG. 4 illustrates an embodiment of a bit-rate vs. signal quality relationship 400. The bit-rate vs. signal quality relationship 300 may be represented by a Peak Signal to Noise Ratio (PSNR) curve comprising a plurality of data points. The data points represent the PSNR values in decibel (dB) that were obtained for a plurality of bit-rate values in kilobit-per-second (kbps). The bit-rate values comprise a bit-rate $R_A$ at about 100 kbps that may correspond to a first stream and a PSNR at about 27 dB and a bit-rate $R_C$ at about 1900 kbps that may correspond to a second stream and a PSNR value at about 38 dB. The bit-rate values also comprise a plurality of bit-rate options that may correspond to a bridging stream. The bridging stream's bit-rate options comprise $R_{B1}$ at about 200 kbps, $R_{B2}$ at about 300 kbps, $R_{B3}$ at about 400 kbps, $R_{B4}$ at about 600 kbps, and $R_{B5}$ at about 900 kbps. The bit-rates $R_{B1}$, $R_{B2}$, $R_{B3}$, $R_{B4}$, and $R_{B5}$ correspond to the PSNR values at about 29 dB, about 30 dB, about 32 dB, about 33 dB, and about 34 dB, respectively.

The PSNR values in FIG. 4 may indicate the signal quality of the corresponding streams, where larger PSNR values represent better signal quality but require increased buffering. Since the difference between $R_C$ and $R_A$ is equal to about 11 dB, the second stream may have significantly improved signal quality in comparison to the first stream, where the video quality content of the first stream may be low for preview purposes. The bridging stream may be used to switch between the first stream and the second stream in response to a customer request to switch to a Foreman Common Intermediate Format (CIF) for code test sequence. Specifically, the PSNR values are obtained using a bw value equal to about 1.1 $R_C$, a RTT value equal to about 100 milliseconds, and a $T_{buff}$ value equal to about five seconds.

The relationship between the bit-rate and the signal quality (PSNR value) may be proportional and nonlinear. Additionally, the PSNR curve may have a nonlinear convex shape, where the amount of increase in PSNR or signal quality due to increase in bit-rate may slow down along the bit-rate range. This bit-rate vs. signal quality characteristic may indicate that relatively small increments in the stream's bit-rate may quickly provide close to full or maximum achievable PSNR. Therefore, using the $R_{B1}$, $R_{B2}$, $R_{B3}$, $R_{B4}$, or $R_{B5}$ bit-rates for the bridging stream may significantly increase the signal quality of the first stream to reach an improved signal quality, which may be satisfactory and/or close to the requested signal quality of the second stream. For example, switching from the bit-rate $R_A$ at about 100 kbps to the bit-rate $R_{B4}$ at about 600 kbps may increase the PSNR from about 27 dB to about 33 dB. As such, increasing the bit-rate to less than half that of the requested second stream (at about 2000 kbps) may provide an improved PSNR substantially close to about the requested stream (at about 37 dB). This may be advantageous for practical network implementation, where the bridging stream may be used to reduce the buffering time and provide significant improvement of video quality using substantially lower bit-rates than requested.

Figure 5:
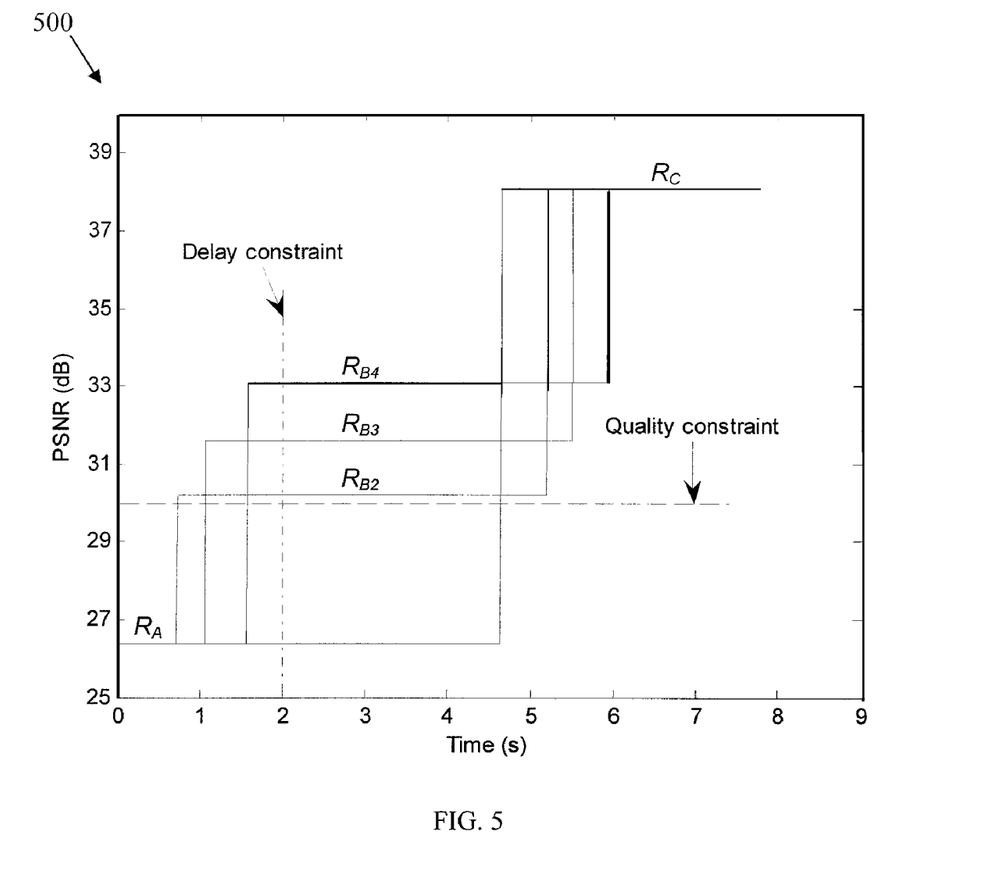
FIG. 5 is a chart of an embodiment of signal quality and delay time.

FIG. 5 illustrates an embodiment of signal quality and delay time 500 associated with using a bridging stream to switch from a first stream to a second stream. Specifically, the first stream and second stream correspond to the bit-rates $R_A$ and $R_C$, respectively, as specified in FIG. 4. The step from $R_A$ to $R_C$ at about five seconds indicates when the customer's view changes from the first stream $R_A$ to the second stream $R_C$. Additionally, in FIG. 5, three options are shown for the bridging stream, which are associated with the bit-rates $R_{B2}$, $R_{B3}$, and $R_{B4}$ specified above. Specifically, the PSNR values (in dB) that correspond to the indicated bit-rates are shown vs. the transmission/reception or decoded video play time (in second) for the corresponding streams. As such, the step from $R_A$ to $R_{B2}$, $R_{B3}$, or $R_{B4}$ at about one second indicates when the customer's view changes from the first stream $R_A$ to the bridging stream $R_A$ to $R_{B2}$, $R_{B3}$, or $R_{B4}$, respectively. For instance, at least a portion of the first stream may be initially provided to the customer during the time period from about zero second to about one second. Next, the bridging stream may be provided to the customer during the time period from about one second to about five seconds. If desired, a plurality of the bridging streams could be transmitted to the user such that the user experiences a gradually improving QoE and/or QoS. Finally, the second stream may be provided to the customer after about five seconds. The bridging stream has a bit-rate higher than the first stream and lower than the second stream, and limited time duration of about four seconds. Thus, the bridging stream may be buffered and provided to improve the signal or video quality in comparison to the first stream at an earlier time (e.g. about four seconds) before the second stream.

Further, providing an improvement in signal or video quality between switching from the first stream to the second stream may also improve the QoS and/or QoE for the customer. For instance, in FIG. 5, a delay constraint (vertical dashed line) and quality constraint (horizontal dashed line) may be configured by the server or a content provider. The delay constraint may indicate a maximum allowed time delay for the customer to experience an improvement in the signal or video quality after a request to switch streams or channels. The quality constraint may indicate a minimum allowed signal quality or PSNR value that may be allowed for the bridging stream and after the minimum allowed time delay. For example, according to the QoS or QoE requirements, the minimum allowed time delay may be equal to about two seconds and the minimum PSNR value may be equal to about 30 dB. As shown in the figure, any of the bit-rates $R_{B2}$, $R_{B3}$, and $R_{B4}$ for the bridging stream may be used to satisfy both the delay constraint and the quality constraint. However, using the bit-rate $R_{B1}$ for the bridging stream may not satisfy the quality constraint since the PSNR may increase after about two seconds to about 29 dB which is less than the minimum required 30 dB value. Alternatively, using the bit-rate $R_{B5}$ that has a higher bit-rate value than $R_{B2}$, $R_{B3}$, and $R_{B4}$ may not satisfy the delay constraint since the delay time may exceed the minimum delay time at about two seconds.

Figure 6:
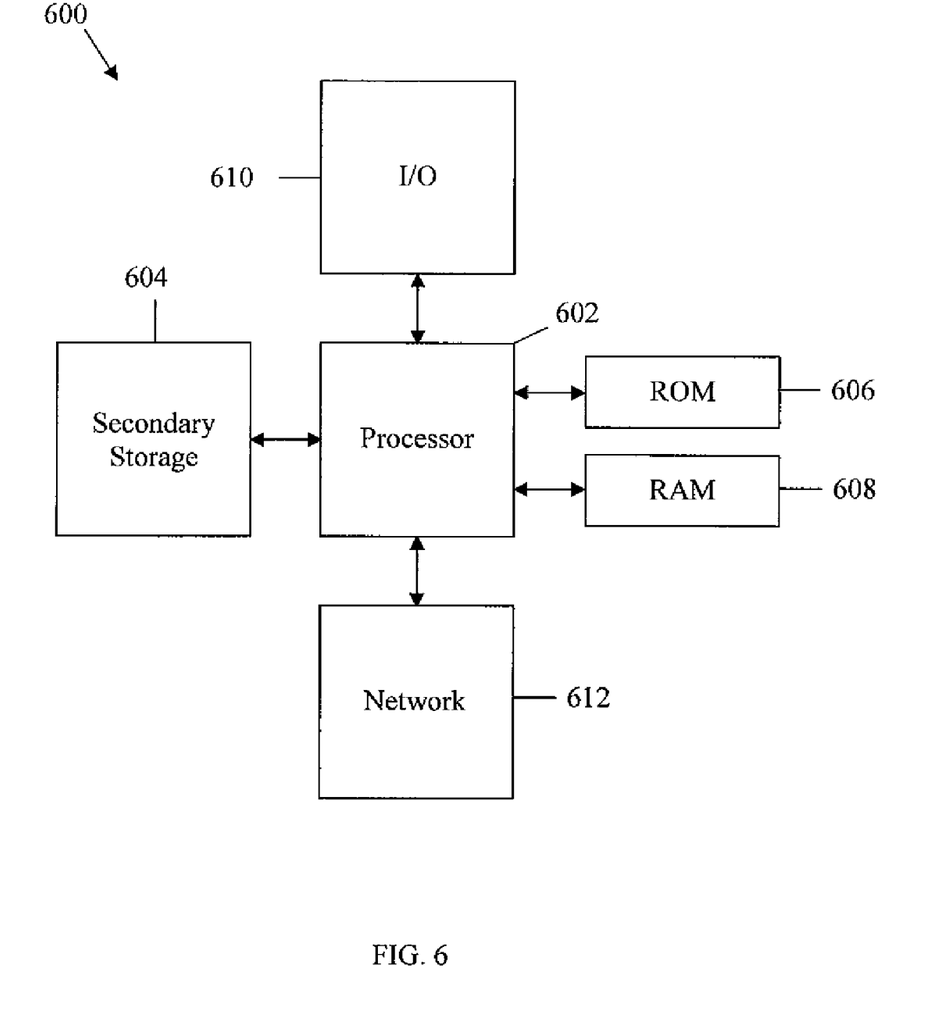
FIG. 6 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 5, 4, etc.; greater than 0.10 includes 0.11, 0.12, 0.15, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 5 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a first node configured to:
      communicate with a second node;
      receive a first stream, a bridging stream, and a second stream from the second node;
      buffer the bridging stream before playing the bridging stream;
      buffer the second stream before playing the second stream; and
      play the bridging stream before playing the second stream,
   wherein the bridging stream has a higher bit-rate than the first stream, but a lower bit-rate than the second stream, and
   wherein the bridging stream has similar content as the first stream and the second stream.

2. The apparatus of claim 1, wherein the bridging stream has a shorter buffering time than the second stream, and wherein the bridging stream has a higher signal quality than the first stream.

3. The apparatus of claim 1, wherein the bridging stream meets a Quality of Service (QoS) requirement and/or a Quality of Experience (QoE) requirement for a customer associated with the second node.

4. The apparatus of claim 1, wherein the bridging stream is transmitted without affecting a network bandwidth.

5. The apparatus of claim 1, wherein the first stream, the bridging stream, and the second stream are transmitted using packet switching.

6. The apparatus of claim 1, wherein the first stream, the bridging stream, and the second stream each comprise video content.

7. The apparatus of claim 1, wherein the first stream, the bridging stream, and the second stream each consist essentially of audio content.

8. An apparatus comprising:
   at least one processor configured to:
   transmit a first stream at a first time;
   transmit a bridging stream at a second time; and
   transmit a second stream at a third time,
   wherein the bridging stream has a greater bit-rate than and a similar content to the first stream, and
   wherein the bridging stream has a lesser bit-rate than and a similar content to the second stream.

9. The apparatus of claim 8, wherein the first time is equal to about the second time and equal to about the third time.

10. The apparatus of claim 8, wherein, the bridging stream is transmitted in response to a request.

11. The apparatus of claim 8, wherein no request to transmit the bridging stream is received by the processor.

12. The apparatus of claim 8, wherein the processor is further configured to transmit a second bridging stream that has a bit-rate greater than the bridging stream and less than the second stream, wherein the second bridging stream has a content similar to the bridging stream and the second stream.

13. The apparatus of claim 8, wherein the second time is equal to about half a roundtrip communication time (RTT/2) between a first node that transmits the request and a second node that receives the request,
   wherein the third time is based on RTT, an effective network bandwidth bw, a minimum buffering time for playing a video frame $T_{buf}$, a minimum response time for playing the bridging stream $T_r$, a minimum response time for playing the second stream $T_c$, the bridging stream's bit-rate $R_B$, or combinations thereof,
   wherein the third time is equal to about $$\frac{(T_c - T_r) \times R_B}{bw},$$

wherein $T_r$ is greater than or equal to about $$\frac{T_{buff} \times R_B}{bw} + RTT,$$

wherein $T_c$ is greater than or equal to about $$\frac{RTT \times bw - T_r \times R_B + T_{buff} \times R_C}{bw - R_B},$$

and where $R_C$ is the second stream's bit-rate.

14. A method comprising:
providing, by a processor coupled to a memory, a first stream having a first bit-rate and a first content;
subsequently providing, by the processor, a bridging stream having a bridging bit-rate greater than about the first bit-rate and a bridging content similar to the first content; and
subsequently providing, by the processor, a second stream having a second bit-rate greater than about the first bit-rate and a second content similar to the bridging content.

15. The method of claim 14, wherein the first stream, the second stream, and the third stream are all buffered at a customer premises, and
wherein the bridging stream is buffered for a longer time than the first stream but for a shorter time than the second stream.

16. The method of claim 15, wherein the first bit-rate satisfies a delay constraint, a quality constraint, or both that is determined by a provider and/or a client.

17. The method of claim 16, wherein a difference between the bridging bit rate and the first bit-rate is less than a difference between the bridging bit-rate and the second bit-rate, and wherein the bridging stream has a signal quality closer to the second stream than the first stream.

18. The method of claim 17, wherein the relationship between the first bit-rate, the bridging bit-rate, the second bit-rate and a plurality of corresponding Peak Signal to Noise Ratios (PSNRs) is proportional, nonlinear, and convex.

19. The method of claim 14, wherein each of the first stream, the bridging stream, and the second stream comprise a sequence of frames, wherein at least some of the frames are common between the first stream and the bridging stream, and wherein at least some of the frames are common between the bridging stream and the second stream.

20. The method of claim 19, wherein at least some of the frames are . common between the first stream and the second stream.

21. The method of claim 20, wherein each of the frames in the bridging stream are common between the first stream, the second stream, or both.

22. The method of claim 14, wherein each of the first stream, the bridging stream, and the second stream comprise an ordered sequence of frames, and wherein each of the frames in the bridging stream are common with both the last ordered frames in the first stream and the first ordered frames in the second stream.

* * * * *

UNITED STATES PATENT AND TRADEMARK OFFICE
CERTIFICATE OF CORRECTION

PATENT NO. : 8,055,785 B2  Page 1 of 1
APPLICATION NO. : 12/561008
DATED : November 8, 2011
INVENTOR(S) : Wei Liu et al.

It is certified that error appears in the above-identified patent and that said Letters Patent is hereby corrected as shown below:

In the Claims:

In column 12, line 17, claim 20, remove the "." between "are" and "common".

Signed and Sealed this
Twentieth Day of December, 2011

David J. Kappos
*Director of the United States Patent and Trademark Office*